US008295655B2

(12) United States Patent
Manipatruni et al.

(10) Patent No.: US 8,295,655 B2
(45) Date of Patent: Oct. 23, 2012

(54) ELECTRO-OPTICAL MODULATOR

(75) Inventors: Sasikanth Manipatruni, Ithaca, NY (US); Qianfan Xu, Houston, TX (US); Michal Lipson, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 634 days.

(21) Appl. No.: 12/310,431

(22) PCT Filed: Aug. 24, 2007

(86) PCT No.: PCT/US2007/018847
§ 371 (c)(1),
(2), (4) Date: Nov. 6, 2009

(87) PCT Pub. No.: WO2008/024513
PCT Pub. Date: Feb. 28, 2008

(65) Prior Publication Data
US 2010/0098372 A1    Apr. 22, 2010

Related U.S. Application Data

(60) Provisional application No. 60/838,919, filed on Aug. 24, 2006, provisional application No. 60/839,975, filed on Aug. 24, 2006, provisional application No. 60/846,530, filed on Sep. 22, 2006, provisional application No. 60/908,004, filed on Mar. 26, 2007.

(51) Int. Cl.
*G02F 1/035* (2006.01)
(52) U.S. Cl. ..................................... 385/3; 385/2; 385/9
(58) Field of Classification Search .................. 385/2, 3, 385/9, 31, 50; 372/92; 359/238, 290
See application file for complete search history.

(56) References Cited

U.S. PATENT DOCUMENTS

| 4,877,299 A | 10/1989 | Lorenzo et al. |
| 6,009,115 A | 12/1999 | Ho |
| 6,052,495 A | 4/2000 | Little |
| 6,341,184 B1 | 1/2002 | Ho et al. |
| 6,633,696 B1 | 10/2003 | Vahala et al. |

(Continued)

FOREIGN PATENT DOCUMENTS
WO   WO-2004017125 A1   2/2004
(Continued)

OTHER PUBLICATIONS

"Chinese Application Serial No. 200780039495.7, Response filed Feb. 10, 2011 to Second Office Action mailed Nov. 25, 2010", (w/ Amended Claims), 24 pgs.

(Continued)

*Primary Examiner* — Ellen Kim
(74) *Attorney, Agent, or Firm* — Schwegman, Lundberg & Woessner, P.A.

(57) ABSTRACT

An optical modulator includes a ring resonator with a waveguide adjacent to and optically coupled to the micro-ring resonator. A p-i-n junction is formed about the ring resonator. An optional additional doped region may be formed opposite the waveguide from the ring resonator and when combined with the p-i-n junction forms a nearly closed p-i-n junction about the ring resonator. The ring resonator may be a silicon micro-ring resonator. Multiple different resonant frequency resonators may be coupled to the waveguide along with different detectors to multiplex light on the waveguide. The spectrum of the resonator may be controlled by an applied voltage. A prepulsing device may be used to enhance electrical transitions to enhance the speed of the modulator.

44 Claims, 4 Drawing Sheets

U.S. PATENT DOCUMENTS

| | | | |
|---|---|---|---|
| 6,636,668 B1 | 10/2003 | Al-hemyari et al. | |
| 6,751,368 B2 | 6/2004 | Lim | |
| 6,801,702 B2 | 10/2004 | Day | |
| 6,839,488 B2 | 1/2005 | Gunn, III | |
| 6,891,996 B2 | 5/2005 | Sercel et al. | |
| 6,895,148 B2 | 5/2005 | Gunn, III | |
| 6,904,187 B2 | 6/2005 | Fischer et al. | |
| 6,947,632 B2 | 9/2005 | Fischer | |
| 7,068,862 B2 | 6/2006 | Lim et al. | |
| 7,092,590 B2 | 8/2006 | Lim et al. | |
| 7,106,917 B2 | 9/2006 | Painter et al. | |
| 7,120,338 B2 | 10/2006 | Gunn, III | |
| 7,164,821 B2 | 1/2007 | Gunn, III | |
| 7,447,387 B2 * | 11/2008 | Shih et al. | 385/2 |
| 2003/0123780 A1 | 7/2003 | Fischer | |
| 2006/0008223 A1 | 1/2006 | Gunn, III et al. | |
| 2006/0023997 A1 | 2/2006 | Almeida et al. | |
| 2006/0215949 A1 | 9/2006 | Lipson et al. | |
| 2008/0056636 A1 | 3/2008 | Shih et al. | |
| 2009/0010587 A1 * | 1/2009 | Shih et al. | 385/2 |
| 2009/0169149 A1 * | 7/2009 | Block | 385/9 |

FOREIGN PATENT DOCUMENTS

| | | |
|---|---|---|
| WO | WO-2005116708 A1 | 12/2005 |
| WO | WO-2008024513 A2 | 2/2008 |
| WO | WO-2008024513 A3 | 2/2008 |

OTHER PUBLICATIONS

"Chinese Application Serial No. 200780039495.7, Second Office Action mailed Nov. 25, 2010", (w/ English Translation), 16 pgs.

"1153.117us1 Restriction Requirement Jun. 15, 2007".

"Final Office Action mailed Jul. 12, 2007 in U.S. Appl. No. 11/137,126", FOAR, 9 pgs.

"International Application Serial No. PCT/US2007/018847, International Search Report mailed Jul. 3, 2008", P220, 6 pgs.

"International Application Serial No. PCT/US2007/018847, Written Opinion mailed Jul. 3, 2008", P237, 3 pgs.

"International Search Report for corresponding PCT Application No. PCT/US2005/018286", (Sep. 9, 2005), 4 pgs.

Almeida, V. R, et al., "All-Optical Switch on a Silicon Chip", *Lasers and Electro-Optics*, 1, (May 16, 2004), 1027-1029.

Almeida, V. R., "Nanotaper for Compact Mode Conversion", *Optics Letters*, 28(15), (2003), 1302-1304.

Barrios, C. A., et al., "Electrooptic Modulation of Silicon-on-Insulator Submicrometer-Size Waveguide Devices", *Journal of Lightwave Technology*, 21(10), (Oct. 2003) 2332-2339.

Barrios, C. A., "Low-Power-Consumption Short-Length and High-Modulation-Depth Siliicon Electrooptic Modulator", *Journal of Lightwave Technology*, 21(4), (2003), 1089-1098.

Cocorullo, G., et al., "Silicon Thermooptical Micromodulator With 700-kHz—3-dB Bandwidth", *IEEE Photonics Technology Letters*, 7(4), (Apr. 1995), 363-365.

Coppola, G., et al., "Simulation and Analysis of a High-Efficiency Silicon Optoelectronic Modulator Based on a Bragg Mirror", *Opt. Eng.*, 40(6), (Jun. 2001), 1076-1081.

Cutolo, A., et al., "An Electrically Controlled Bragg Reflector Integrated in a Rib Silicon on Insulator Waveguide", *Applied Physics Letters*, 71(2), (Jul. 1997), 199-201.

Cutolo, A., et al., "Silicon Electro-Optic Modulator Based on a Three Terminal Device Integrated in a Low-Loss Single-Mode SOI Waveguide", *Journal of Lightwave Technology*, 15(3), (Mar. 1997), 505-518.

Dainesi, P., et al., "CMOS Compatible Fully Integrated Mach-Zehnder Interferometer in SOI Technology", *IEEE Photonics Technology Letters*, 12(6), (Jun. 2000), 660-662.

Giguere, S. R., et al., "Stimulation Studies of Silicon Electro-Optic Waveguide Devices", *Journal of Applied Physics*, 58(10), (1990), 4964-4970.

Hewitt, P. D., et al., "Improved Modulation Performance of a Silicon p-i-n. Device by Trench Isolation", *Journal of Lightwave Technology*, 19(3), (Mar. 2001), 387-390.

Hewitt, P. D., et al., "Improving the Response of Optical Phase Modulators in SOI by Computer Simulation", *Journal of Lightwave Technology*, 18(3), (Mar. 2000), 443-450.

Ibrahim, T. A, et al., "All-Optical Switching in a Laterally Coupled Microring Resonator by Carrier Injection", *Photonics Technology Letters*, 15(1), (Jan. 2003), 36-38.

Ibrahim, T. A., et al., "Alt-Optical Switching in a Laterally Coupled Microring Resonator by Carrier Injection", *IEEE Photonics Technology Letters*, 15(1), (2003), 36-38.

Irace, A., et al., "Fast Silicon-on-Silicon Optoelectronic Router Based on a BMFET Device", *IEEE Journal of Selected Topics in Quantum Electronics*, 6(1), (Jan./Feb. 2000), 14-18.

Kimmerling, L. C., "Photons to the Rescue: Microelectronics Becomes Microphotonics", *Interface*, (Summer, 2000), 28-31.

Little, B. E., et al., "Ultra-Compact Si-SiOsub2 Microring Resonator Optical Channel Dropping Filters", *IEEE Photonics Technology Letters*, 18(4), (Apr. 1998), 549-551.

Liu, A., et al., "A High-Speed Silicon Optical Modulator Based on a Metal-OxideSemiconductor Capactor", *Nature*, 427, (2004), 615-618.

Png, C. E., et al., "Development of Small Silicon Modulators in Silicon-on-Insulator (SOI)", *Proceedings of SPIE—Photonics Packaging and Integration III*, vol. 497, (2003), 190-197.

Rabiei, P., "Polymer Micro-Ring Filters and Modulators", *Journal of Lightwave Technology*, 20(11), (2002), 1968-1975.

Soref, R. A., et al., "Electro-Optical Modulation in Si sub1 -x GE sub x /Si and Related Heterostructures", *International Journal of Optoelectronics*, 9(2), (1994), 205-210.

Soref, R. A., et al., "Electrooptical Electronics Effects in Silicon", *IEEE Journal of Quantum*, vol. QE-23(1), (Jan. 1987), 123-129.

Soref, R. A., et al., "Kramers-Koenig Analysis of E-O Switching in Silicon", *Proceedings. International Society of Optical Engineers (SPIE)—Integrated Optical Circuit Engineering IV*, vol. 704, (1986), 32-37.

Van Zeghbroeck, B. V., "", *Principles of Semiconductor Devices*, http://web.archive.org/web/20050207053745/http://ece-www.colorado.edu/~bart/book/, (archived Feb. 7, 2005), 1 pg.

Verdeyen, J. T., "", *Laser Electronics*, 2nd Edition, Prentice-Hall, Englewood, Cliffs, NJ, (1989), 137-139.

Zhao, C. Z., et al., "Zero-Gap Directional Coupler Switch Integrated Into a Silicon-on Insulator for 1.3-um Operation", *Optics Letters*, 21(20), (Oct. 15, 1996), 1664-1666.

"Chinese Application Serial No. 200780039495,7, Response filed Sep. 2, 2011 to Office Action mailed May 11, 2011", (w/ English Translation of Pending Claims), 11 pgs.

"Chinese Application Serial No. 200780039495.7, Office Action mailed May 11, 2011", 3 pgs.

"Chinese Application Serial No. 200780039495.7, Office Action mailed Mar. 30, 2010", (w/ English Translation), 11 pgs.

"Chinese Patent Application Serial No. 200780039495.7, Response filed Oct. 14, 2010 to Office Action mailed Mar. 30, 2010", (w/ English Translation of Claims), 14 pgs.

"Fullwave Version 2.0e—Full-Vectorial Time-Domain Analysis of Photonic Devices", [online]. Retrieved from the Internet: <http://web.archive.org/web/20050205111121/http://www.rsoftinc.com/fullwave.htm>, (archived Feb. 5, 2005), 1 pg.

Lee, K. K., "Transmission and Routing of Optical Signals in On-Chip Waveguides for Silicon Microphtonics", *Thesis, Massachusetts Institute of Technology*, [online]. https://dspace.mit.edu/bitstream/1721.1/8768/1/48124503.pdf, (Feb. 2001), 143 pgs.

"Chinese Application Serial No. 200780039495.7, Office Action mailed Oct. 19, 2011", 3 pgs.

"Chinese Application Serial No. 200780039495.7, Response filed Dec. 7, 2011 to Office Action mailed Oct. 19, 2011", (w/ English Translation of Amended Claims), 11 pgs.

\* cited by examiner

ELECTRO-OPTICAL MODULATOR

RELATED APPLICATIONS

This application is a nationalization under 35 U.S.C. 371 of PCT/US2007/018847, filed Aug. 24, 2007 and published as WO 2008/024513 A2 on Feb. 28, 2008, which claimed priority under 35 U.S.C. 119(e) to U.S. Provisional Patent Application Ser. No. 60/839,919, filed Aug. 24, 2006; U.S. Provisional Patent Application Ser. No. 60/839,975, filed Aug. 24, 2006; U.S. Provisional Patent Application Ser. No. 60/846,530, filed Sep. 22, 2006 and U.S. Provisional Patent Application Ser. No. 60/980,004, filed Mar. 26, 2007; which applications and publication are incorporated herein by reference and made a part hereof.

GOVERNMENT FUNDING

This invention was made with Government support under Grant Number HR0011-05-C-0027 awarded by DARPA EPIC. The United States Government has certain rights in the invention.

BACKGROUND

Light offers many advantages when used as a medium for propagating information, such as increased speed and bandwidth. Light-wave transmission along optical fibers is widespread in the telecommunications industry. Optical interconnections on silicon have become a bottleneck for next generation computing systems. It is desirable to have an optical interconnection system that is CMOS compatible.

DETAILED DESCRIPTION

Figure 1:
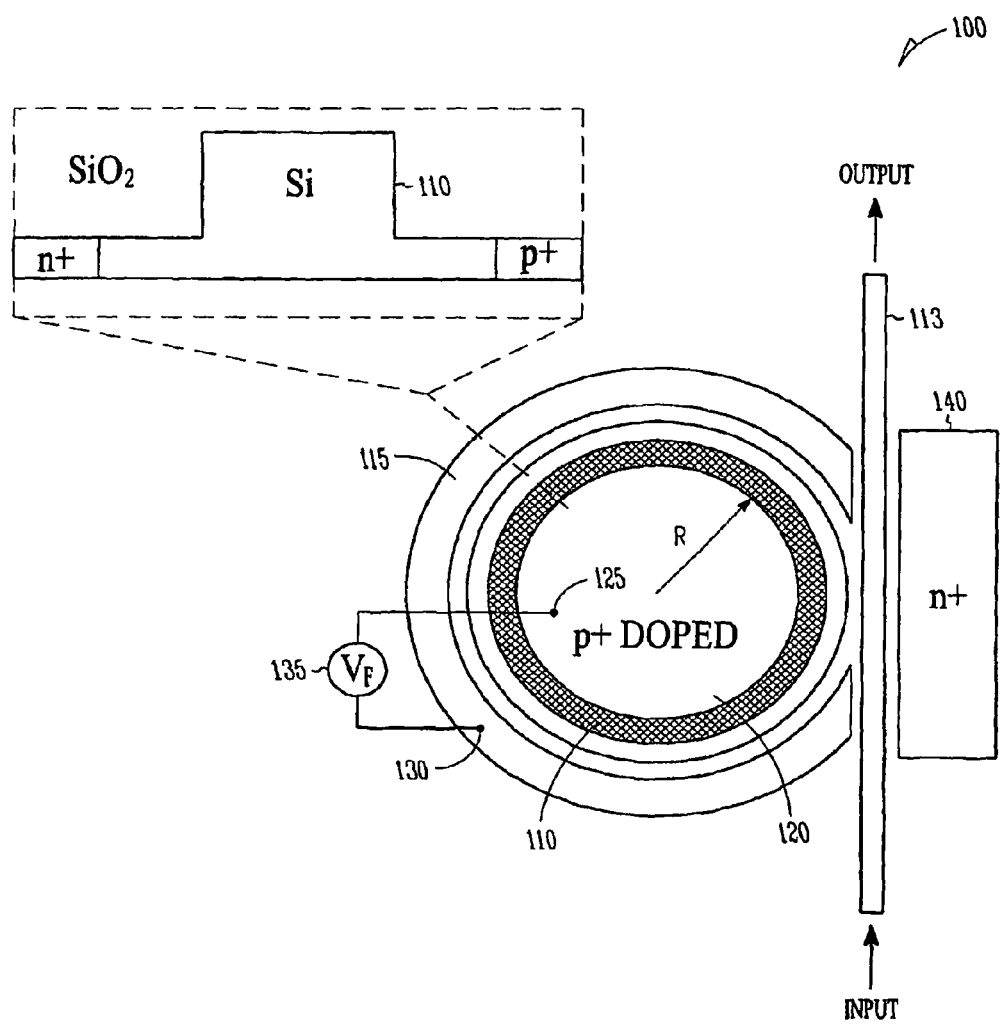
FIG. 1 is a block diagram representation of a top view of an optical modulator that includes a ring resonator according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Silicon modulators are a key component for CMOS-compatible optical interconnection systems. A silicon micro-ring resonator based modulator shown generally at 100 in FIG. 1 consists of a ring resonator embedded with a PIN junction. The junction is used to inject and extract free carriers into a ring 110, which in turn modifies the refractive index of silicon that forms the ring 110 through a dispersion effect. The ring may be optically coupled to an input/output "I/O" waveguide 113. In one embodiment, an n+ doped region 115 is formed in a ring shape adjacent the outside of the ring 110. A p+ doped region 120 is formed inside the ring 110. A contacts 125, 130 may be formed to such doped regions and a voltage source 135 applied across the contacts.

As viewable in FIG. 1, the n+ doped region 120 only extends part way around the ring 110, as the optical contact with the waveguide 113 leaves no room for continuing the n+ doped region 120. When the p-i-n junction is formed on only part of the ring resonator, the speed of the modulator may be limited to approximately 400 Mbps with non-return-to-zero coding, because while carriers diffuse into the section of the ring that is not part of the p-i-n junction, where they can not be efficiently extracted during the reverse biased period, leading to a longer fall time following consecutive logical '1's.

In one embodiment, an additional n+-doped region 140 is formed on the other side of the I/O waveguide 113 to form nearly closed p-i-n junctions. This new geometry helps ensure that carriers injected into the ring can be extracted efficiently by reversely biasing the junction. Therefore the operation speed can be significantly increased. High quality modulation signal has been obtained at 4 Gbps. Decreased in contact resistance and better impedance matching between the device and the RF driver are expected to result in higher than 10 Gbps modulation.

In one embodiment, charges are injected and extracted from the ring 110. Four concentric ring shaped doping regions may be formed with n-type, p-type, intrinsic, and n-type silicon. The intrinsic region is formed by a ring shaped cavity 110. The device behaves like a p-i-n diode in series with an n-p diode. The turn-on and turn-off transients may be very fast, on the order of <30 ps in one embodiment, leading to high data rates.

In one embodiment, ring 110 has an approximately 10 micron diameter and is embedded in the n-p-i-n device. The silicon ring may be manufactured on silicon on insulator wafer using CMOS compatible technology. In one embodiment, ring 110 is a ring resonator. Light at the resonant frequency of the ring 110 travels many times around the ring, and interacts with the same carriers many times. As a result, the total number of carriers needed to change the optical transmission of the ring resonator is less than some other resonators. Further, less power may be used to drive the carriers into and out of the active region.

Figure 2:
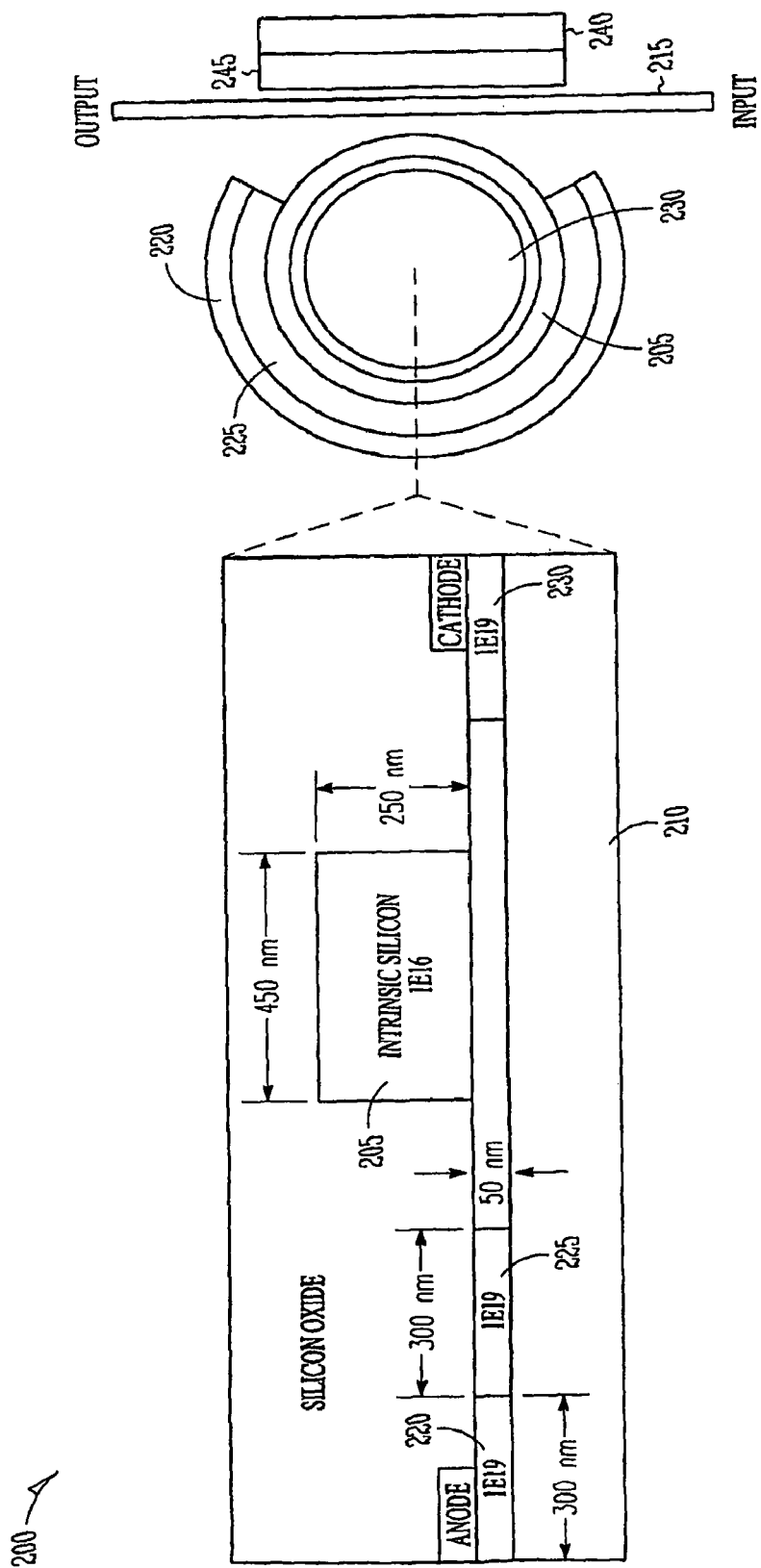
FIG. 2 is a side view of a portion of a optical ring resonator modulator having an N-P-I-N junction according to an example embodiment.

An alternative ring modulator 200 is described with reference to FIG. 2, which shows a cross section and top view of a portion of a ring resonator 205. In one embodiment, ring resonator 200 is fabricated on a silicon-on-insulator substrate 210 with a 3-mm-thick buried oxide layer. Both a waveguide 215 coupling to the ring 205 and the ring itself have a width of approximately 450 nm and a height of 250 nm. The diameter of the ring is approximately 10-12 µm, and the spacing between the ring and the I/O waveguide is approximately 200 nm. These dimensions may be varied significantly in further embodiments. In one embodiment, nano-tapers may be formed on each end of the I/O waveguide to facilitate coupling efficiency between the waveguide and an incoming optical fiber.

In one embodiment, a junction is formed integrated with the ring 205. The ring 205 may be said to be embedded in the junction. The junction comprises an outer n doped ring region 220, an outer or p doped ring region 225 sandwiched between the n doped ring region 220 and the ring 205, and an inner n doped region 230 inside the ring 205. An anode contact 227 may be formed electrically coupled to the outer n doped region 220, and a cathode contact 228 may be formed electrically coupled to the inner n doped region 230.

In one embodiment, the outer n doped region 220 and outer p doped region 225 are interrupted by the waveguide 215. They may however be continued adjacent the other side of the waveguide as shown at an adjacent doped region 240 and an adjacent p doped region 245, along with an additional anode contact formed coupled to region n doped 240.

Modulator 200, incorporating an N-P-I-N device with the ring resonator may overcome slow rise time dynamics of pin devices without the need for pulse shaping. In some embodiments, turn-on and turn-off transients are extremely fast, such as less than 30 ps, leading to high data rates. Some embodiments using a silicon ring of approximately 10 microns may operate at around 40 billion bits per second.

In one embodiment, a transient response to a 2V step voltage of the device 200 may have an electrical transition time <50 ps. The hole concentration may reach $10^{16}/cm^3$ in 18 ps, hence bit rates exceeding 40 gbps can be expected from the device. The N-P-I-N structure induces ultra-fast transitions since rise and fall times are determined by the turn off times of the diodes which can be extremely short. In one embodiment the device conducts only during the periods of transition of one of the diodes from ON state to OFF state, hence producing fast electrical transition times of the order of 25 ps. Note that in contrast, a P-I-N diode in forward bias takes about ~1 ns to reach the steady state. A high extinction ratio is achieved by controlling the amount of charge injection by careful design of the PN junctions. The injected charge equals the depletion charge of the diodes. For the present design, the injected carrier density is $10^{16}/cm^3$ which corresponds to an index change of $0.62\times10^{-4}$. Due to the resonant nature of the modulator this index change produces strong modulation in the optical transmission.

The maximum sequence of ones (logic high bits) that the modulator in one embodiment can modulate is more than 30 bits. This cutoff is determined by the surface recombination decay of carriers. It is estimated that with a surface recombination velocity of 100 cm/s the carrier life time is ~1.26 ns. Therefore, the device will remain in an on state for ~1 ns, equivalent to 40 bits, before the recombination leads to shift in the resonance. Hence, the N-P-I-N modulator can be designed for modulating $2^{>3}-1$ pseudo random bit sequences.

The structures may be defined using electron-beam lithography followed by reactive ion plasma etching in one embodiment. Other methods may be used to form the ring resonator in further embodiment.

Following the etching, an n+ region 215 and a p+ region 220 are each defined with photolithography and implanted with suitable dopants, such as phosphorus and boron to create concentrations of approximately $10^{19}/cm^3$.

A 1 mm thick silicon dioxide layer is then deposited onto the wafer using plasma enhanced chemical vapor deposition followed by an annealing process to activate the dopants (15 s at 1,050° C. for p+, and 15 min at 900° C. for n+). Holes may then be patterned using photolithography and then etched down to the doped silicon regions, followed by evaporation and liftoff of titanium contacts. The actual dimensions of the various elements may be varied and the example is not intended to be limiting.

Figure 3:
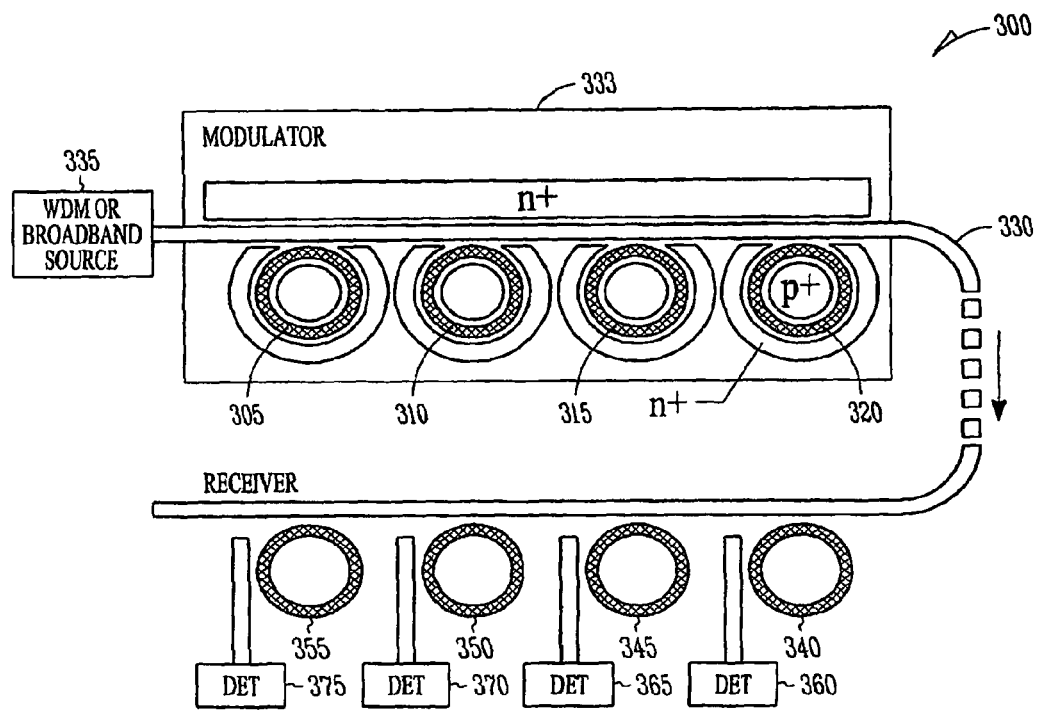
FIG. 3 is a block schematic diagram of an optical multiplexer according to an example embodiment.

A multiple resonator (ring, racetrack, disk, etc.) modulator is shown generally at 300 in FIG. 3. The resonators modulate light at particular wavelengths (the resonant wavelengths of the resonators) and allow light at all other wavelengths to pass through the modulators without been affected. The resonators may be either resonators 100 or 200. For simplicity, the following description utilizes resonators 100, but resonators 200 may be easily substituted in further embodiments. In one embodiment, multiple resonator based modulators 305, 310, 315, and 320 with different resonate wavelengths are cascaded on a single waveguide 330. In one embodiment, the resonators may share a single n+ region 333 opposite the waveguide. Multiple data channels may be modulated onto different wavelengths of light from a wavelength division multiplexing (WDM) source 335 or a broadband source in that waveguide independently. At a receiver side, these channels can be demultiplexed using similar resonators 340, 345, 350, and 355 with drop ports 360, 365, 370, 375 respectively, and detected separately. In one embodiment, quality factors (Q) of the resonators is around at least 15,000 to 20,000 so that photon lifetime remains reasonable small compared to electrical transition times to avoid distortion in the modulated signal. A variation of the resonant wavelength of each resonator may be mainly du to the variation of average waveguide width in a fabrication process. A 1 nm change in the average waveguide width induces a resonant wavelength shift of approximately 0.8 nm in one embodiment. Local heating of each ring resonator may be used to compensate for such shifts in resonant wavelength if desired.

In one embodiment, an extinction ratio of the device, defined as $10 \log 10(P_{high}/P_{low})$ may be achieved by controlling the amount of charge injection by careful design of the PN junctions. The injected charge equals the depletion charge of the diodes. In one embodiment, the injected carrier density is approximately $10^{16}/cm^3$, which corresponds to an index change of approximately $0.62\times10^{-4}$. Due to the resonant nature of the modulator, this index change produces strong modulation in the optical transmission.

In one embodiment, a maximum sequence of ones or logic high bits that the modulator can modulate is more than 30 bits. The cutoff may be determined by surface recombination decay of carriers.

The cascaded semiconductor material based micro-ring modulators may be a central component of a WDM interconnection system. In one embodiment, the resonators are formed of silicon. In one embodiment, each of the ring modulators have an approximately 5-μm radius and may be modulated at 4 Gbit/s. Inter-channel crosstalk is minimized with an approximately 1.3-nm channel spacing or larger.

Light from the WDM source 335 or a broadband source is sent into the silicon waveguide 330 coupled to the multiple ring modulators 305, 310, 315, and 320 with different resonant wavelengths. If the input is a WDM source, the resonant wavelength of each modulator may be selected to match the wavelength of each channel of the WDM source. At the receiver side, these channels can be demultiplexed using similar ring resonators 340, 345, 350 and 355 with drop ports, and detected separately. If the input is a broadband source, the resonant wavelengths of the ring modulators may be selected to match those of the ring demultiplexers one by one.

In one embodiment, the cascaded modulators are fabricated on a silicon-on-insulator (SIO) substrate. The speed of the modulator in one embodiment may be limited to 400 Mbps with non-return-to-zero (NRZ) coding. In one embodiment, the p-i-n junction is nearly closed by the addition of the n+ region 333. Carriers injected into the ring can be extracted efficiently by reversely biasing the junction. The distance between the doped regions and the edge of the ring resonators and straight waveguides may be reduced from approximately 1 μm in some embodiments to approximately 300 nm to further increase the extraction speed with the same reverse bias voltage. The radii of the four ring resonators are approximately 4.98 µm, 5 µm, 5.02 µm, and 5.04 µm, respectively. The difference in the radii corresponds to a channel spacing of 3.6 nm.

Figure 4:
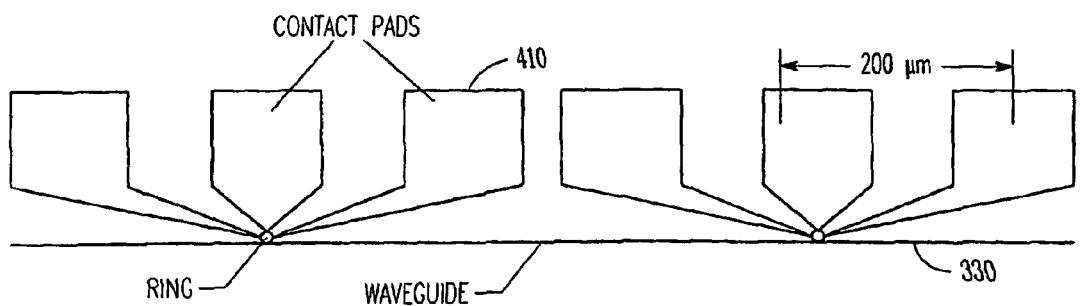
FIG. 4 is a top view diagram of a fabricated optical multiplexer according to an example embodiment.

A top-view microscopic picture of a fabricated device is shown in FIG. 4. Two of the four ring modulators are shown in the picture. The ring resonators are optically coupled to the straight waveguide 330, Metal pads 410 are shown contacting the p+ and n+ doped regions.

Figure 5:
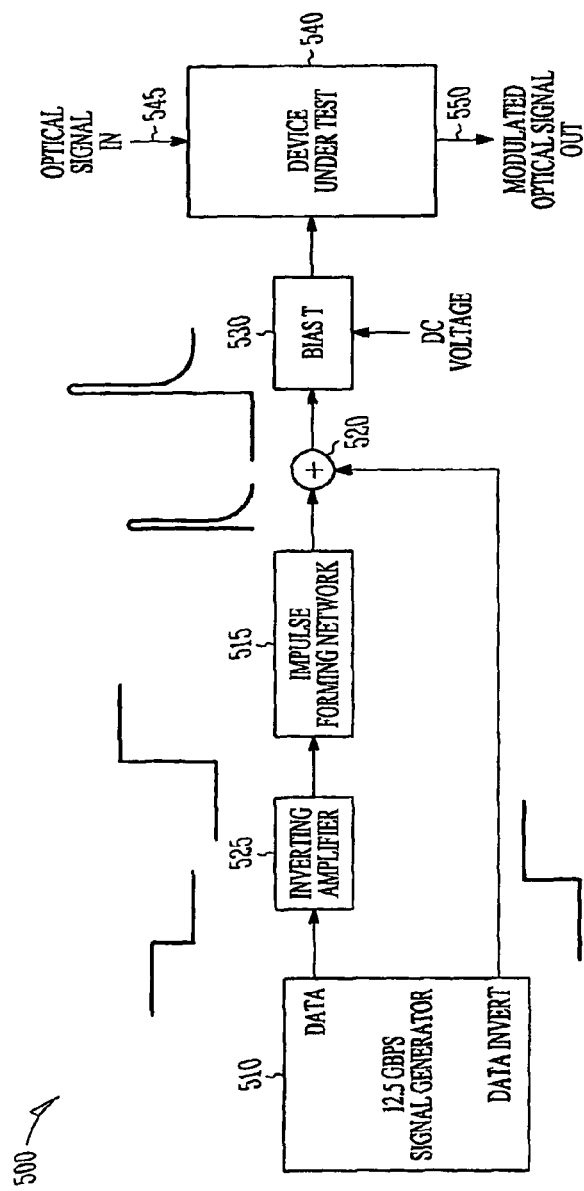
FIG. 5 is a block schematic diagram of a system that generates pre-pulsed driving signals for an electro-optical modulator according to an example embodiment.

In one embodiment, a prepulsed driving signal may be used to drive the junctions of the modulators. A block diagram of a system 500 for generating prepulsed driving signals for enhanced carrier injection is illustrated in FIG. 5. The prepulsed driving signal is formed by passing the signal from a signal generator 510 into an impulse forming network 515 and combining the impulses from the impulse forming network 515 with the original signal at adder 520. In one embodiment, an inverting amplifier 525 is coupled between the signal generator 510 and impulse forming network 515 for inverting the signal provided by the signal generator. A DC bias may be added to the impulses at a bias T circuit 530 before being provided to an optical modulator 540. The impulses may be used to cause modulator 540 to modulate and optical input signal 545 to provide a modulated optical output signal 550.

In one embodiment, zero to one and one to zero representative transitions in the driving signals are enhanced by the prepulsing signal. The prepulse increases the rate of injection of carriers while limiting the total carriers injected. Since the total number of injected carriers is limited, the extraction time may be reduced.

Example NRZ signal amplitudes include 1.62V and 3.00V. Many other amplitudes may be used in further embodiments. An example duration of the pulse is approximately 50 ps in one embodiment. Such signals may result in an enhanced transient response from the modulator. Pseudo0random NRZ pulses of approximately 12.5 gbps may be used in some embodiments. In one embodiment, an RF amplifier output voltage may be set to approximately 5V at the peak of a pulse with a steady state voltage of 4V and a DC bias of −1 V.

A relatively high driving voltage (5 V) may be used to compensate for high contact resistances of the fabricated device (~10 KΩ). The contact resistance may be greatly reduced by optimizing the doping profile and annealing condition for the contacts. A lower driving voltage may be used with such lowered contact resistances.

In one embodiment, an overshoot may be observed on every rising edge of the signal. While a small portion of this overshoot may be due to the response of an optical detector, most of the overshoot may arise from the inherent property of the ring modulator when the rising time is comparable to the photon lifetime of the resonator. When the resonator is at the on-resonance state with low optical transmission, light is trapped inside the resonator with high optical intensity. The optical transmission at this state is low because the light coupled back from the ring resonator destructively interferes with the directly transmitted light in the output waveguide. When the cavity is quickly tuned from the on-resonance state to off-resonance state, the input light is transmitted through the device with little coupling to the ring resonator. At the same time, light trapped inside the resonator is slightly wavelength shifted due to the temporal change of refractive index. Therefore, instead of destructively interfering with the uncoupled input wave, the trapped light couples back into the output waveguide and beats with the input wave, resulting in an overshoot and damped oscillation. The frequency of the damped oscillation is proportional to the wavelength shift of the trapped light and the damping rate is determined by the photon lifetime of the resonator.

Figure 6:
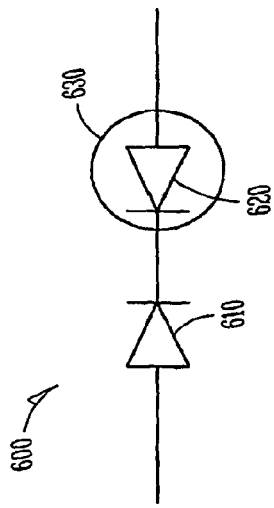
FIG. 6 is a block diagram of an alternative prepulsing device according to an example embodiment.

An alternative device illustrated as a lumped component equivalent at 600 in FIG. 6 may be used to achieve a prepulsing effect on a chip containing a modulator. Device 600 consists of two equivalent diodes 610, 620 connected in reverse directions. A ring resonator 630 embedded in a p-i-n diode forms one of the diodes. Since the device consists of two diodes 610, 620 connected in series in opposite directions, the net device 600 is non-conducting in steady state irrespective of the polarity of applied voltage. However, the device 600 conducts during the turn on-turn off time of the diodes 610, 620. Hence, the device 600 conducts only during the transitions in the drive voltage. In various embodiment, the speed of silicon electro-optic modulators may be up to 40 gbps or higher using pulse shaping techniques.

In one embodiment, the modulator can be used for wavelength multiplexing with hundreds of carriers. This will lead to bandwidths approaching 1 Tera bit per second on silicon based systems. In further embodiments, the modulator may overcome the limitation of similar P-I-N based electro-optic modulators in silicon by reducing both the rise and fall time of the electrical response of the device. In one embodiment, rise and fall times may be approximately 40 ps and 60 ps respectively. The pulsed driving may also enhance the small signal bandwidth of the modulator.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. An optical modulator comprising:
   a ring resonator;
   a waveguide adjacent to and optically coupled to the micro-ring resonator;
   a p-i-n junction, wherein the ring resonator is embedded with the p-i-n junction; and
   an additional doped region opposite the waveguide from the ring resonator.

2. The optical modulator of claim 1 wherein the additional doped region combined with the p-i-n junction forms a nearly closed p-i-n junction about the ring resonator.

3. The optical modulator of claim 1 wherein the ring resonator is a silicon micro-ring resonator.

4. The optical modulator of claim 1 wherein the p-i-n junction comprises an n+ doped area outside of the ring resonator, and a p+ doped area inside of the ring resonator, and wherein the additional doped region is n+ doped.

5. The optical modulator of claim 1 and further comprising electrical contacts formed in electrical contact with the n+ and p+ doped areas and the additional doped region.

6. The optical modulator of claim 1 and further comprising an electrical driver coupled to the p-i-n junction that provides a pulse shaped input to the p-i-n junction.

7. An optical modulator comprising:
   a ring resonator;
   a waveguide adjacent to and optically coupled to the micro-ring resonator;
   a p-i-n junction formed about the ring resonator; and
   an electrical driver coupled to the p-i-n junction that provides a pulse shaped input to the p-i-n junction.

8. The optical modulator of claim 7, wherein the pulse shaped input increases electro-optic modulation speed.

9. The optical modulator of claim 8 wherein the electro-optic modulation speed is increased up to 12.5 gbps.

10. The optical modulator of claim 7, wherein the ring resonator is of a micrometer scale feature size.

11. The optical modulator of claim 7, wherein the ring resonator is frequency selective.

12. The optical modulator of claim 11 wherein the modulator may be used for simultaneously modulating many carriers.

13. The optical modulator of claim 7 wherein the diode comprises an n-p-i-n device.

14. The optical modulator of claim 7, formed using a complementary metal oxide semiconductor, (CMOS) silicon fabrication facility.

15. The optical modulator of claim 7 integrated into a integrated microelectronic chip.

16. The optical modulator of claim 7 wherein injected charges are limited to less than 0.5 million electrons and hence reduces the power consumption to a level adequate for microelectronic integration.

17. An optical modulator comprising:
   a waveguide;
   a plurality of micro-ring resonators serially disposed along and coupled to the waveguide;
   a plurality of p-i-n junctions formed about the ring resonators;
   an additional doped region opposite the waveguide from the ring resonators; and
   a plurality of detectors coupled to the waveguide.

18. The optical modulator of claim 17 wherein the detectors comprise multiple ring resonators optically coupled to the waveguide.

19. The optical modulator of claim 17 wherein the plurality of micro-ring resonators have different resonant frequencies, and wherein the plurality of detectors have corresponding different resonant frequencies to demultiplex optical signals of different frequencies.

20. The optical modulator of claim 17 wherein the p-i-n junctions comprise an n+ doped area outside of a corresponding ring resonator, and a p+ doped area inside of the corresponding ring resonator, and wherein the additional doped region is n+ doped.

21. The optical modulator of claim 17 and further comprising electrical contacts formed in electrical contact with each n+ and p+ doped areas and the additional doped region of the p-i-n junctions.

22. The optical modulator of claim 17 and further comprising an electrical driver coupled to the p-i-n junction that provides a pulse shaped input to the p-i-n junction.

23. A device comprising:
   a waveguide;
   a plurality of semiconductor optical modulators having different resonant frequencies disposed along and coupled to the waveguide wherein the modulators have integrated p-i-n junctions; and
   a plurality of detectors having corresponding different resonant frequencies coupled to the waveguide.

24. The device of claim 23 wherein the detectors comprise multiple ring resonators optically coupled to the waveguide.

25. The device of claim 23 wherein the plurality of optical modulators comprise silicon micro-ring resonators.

26. The device of claim 25 wherein the micro-ring resonators have dynamically adjustable resonant frequencies.

27. The device of claim 23 wherein the plurality of optical modulators modulate multiple data channels onto different wavelengths of light in the waveguide.

28. The device of claim 23 wherein each optical modulator comprises an additional doped region opposite the waveguide from the optical modulator.

29. The device of claim 28 wherein the p-i-n junctions comprise an n+ doped area outside of a corresponding ring modulator, and a p+ doped area inside of the corresponding ring modulator, and wherein the additional doped region is n+ doped.

30. The device of claim 28 and further comprising electrical contacts formed in electrical contact with each n+ and p+ doped areas and the additional doped region of the p-i-n junctions.

31. The device of claim 23 and further comprising an electrical driver coupled to the p-i-n junction that provides a pulse shaped input to the p-i-n junction.

32. An optical modulator comprising:
   a ring resonator;
   a waveguide adjacent to and optically coupled to the ring resonator;
   an N-P-I-N junction integrated with the ring resonator.

33. The optical modulator of claim 32 and further comprising an additional p and n doped region opposite the waveguide from the ring resonator to form a nearly closed N-P-I-N junction around the ring resonator.

34. The optical modulator of claim 32 wherein the N-P-I-N junction comprises an outer n doped region followed by a sandwiched p doped region between the n doped region and the ring resonator, and an inner n doped region inside of the ring resonator.

35. The optical modulator of claim 34 and further comprising an anode contact formed on the outer n doped region and a cathode contact formed on the inner n doped region.

36. The optical modulator of claim 32 wherein the ring resonator is a silicon micro-ring resonator.

37. The optical modulator of claim 32 having an electro-optic modulation speed consistent with a bit rate of 40 gbps.

38. A device comprising:
   a waveguide;
   a plurality of semiconductor optical modulators having different resonant frequencies disposed along and coupled to the waveguide wherein the resonators have integrated N-P-I-N junctions; and
   a plurality of detectors having corresponding different resonant frequencies coupled to the waveguide.

39. The device of claim 38 wherein the detectors comprise multiple ring resonators optically coupled to the waveguide.

40. The device of claim 38 wherein the plurality of optical modulators comprise silicon micro-ring resonators.

41. The device of claim 40 wherein the micro-ring resonators have dynamically adjustable resonant frequencies.

42. The device of claim 40 wherein the micro-ring resonators modulate multiple data channels onto different wavelengths of light in the waveguide.

43. The device of claim 40 wherein each micro-ring resonator comprises additional doped p and n regions opposite the waveguide from the micro-ring resonator.

44. The device of claim 43 wherein the N-P-I-N junctions comprise an outer n doped region followed by a sandwiched p doped region between the n doped region and the ring resonator, and an inner n doped region inside of the ring resonator.

* * * * *

UNITED STATES PATENT AND TRADEMARK OFFICE
CERTIFICATE OF CORRECTION

PATENT NO. : 8,295,655 B2  
APPLICATION NO. : 12/310431  
DATED : October 23, 2012  
INVENTOR(S) : Manipatruni et al.

Page 1 of 1

It is certified that error appears in the above-identified patent and that said Letters Patent is hereby corrected as shown below:

On the Title Page

On page 2, in column 2, under "Other Publications", line 2, delete "p-i-n." and insert --p-i-n--, therefor In the Specification In column 3, line 47, delete "$2^{>3}$" and insert --$2^{>30}$--, therefor In column 4, line 59, delete "(SIO)" and insert --(SOI)--, therefor Signed and Sealed this  
Ninth Day of December, 2014

Michelle K. Lee  
*Deputy Director of the United States Patent and Trademark Office*